US006190029B1

(12) United States Patent
Taniuchi et al.

(10) Patent No.: US 6,190,029 B1
(45) Date of Patent: Feb. 20, 2001

(54) HEADLAMP WITH BEAM DISTRIBUTION SWITCH MECHANISM

(75) Inventors: Hitoshi Taniuchi; Hiroshi Iwasaki; Takashi Sato, all of Tokyo (JP)

(73) Assignee: Stanley Electric Co., Ltd., Tokyo (JP)

( * ) Notice: Under 35 U.S.C. 154(b), the term of this patent shall be extended for 0 days.

(21) Appl. No.: 09/160,680

(22) Filed: Sep. 25, 1998

(51) Int. Cl.[7] .................................................. B60Q 1/00

(52) U.S. Cl. .......................... 362/512; 362/539; 362/303; 362/302; 362/280; 362/513; 362/277

(58) Field of Search .................................... 362/512, 277, 362/513, 280, 302, 303, 539

(56) References Cited

U.S. PATENT DOCUMENTS

| | | | | |
|---|---|---|---|---|
| Re. 34,253 | | 5/1993 | Fratty et al. . | |
| 1,834,542 | | 12/1931 | Karlebo . | |
| 4,987,521 | | 1/1991 | Fratty et al. . | |
| 5,213,406 | | 5/1993 | Neumann et al. . | |
| 5,264,993 | | 11/1993 | Neumann et al. . | |
| 5,718,505 | | 2/1998 | Daumeuller et al. . | |
| 5,769,525 | | 6/1998 | Daumeuller et al. . | |
| 5,899,559 | * | 5/1999 | Lachmayer et al. | 362/513 |
| 5,938,319 | * | 8/1999 | Hege | 362/459 |
| 6,059,435 | * | 5/2000 | Hamm et al. | 362/514 |

FOREIGN PATENT DOCUMENTS

| | | | | |
|---|---|---|---|---|
| 19756437 | * | 6/1999 | (DE) | 362/514 |
| 1376728 | | 9/1963 | (FR) . | |
| 8111101 | | 4/1996 | (JP) . | |

* cited by examiner

*Primary Examiner*—Sandra O'Shea
*Assistant Examiner*—Anabel Ton
(74) *Attorney, Agent, or Firm*—Ostrolenk, Faber, Gerb & Soffen, LLP

(57) ABSTRACT

A headlamp 1 has a beam distribution switch mechanism that comprises a hood 3 and a reflecting mirror 4. The hood 3 includes a fixed member 31 having a cut portion 31*a* on the upper side and a moving member 32 for opening and closing the cut portion. The reflecting mirror 4 includes a first reflecting surface 41 for reflecting the light beam from the light source 2 when the cut portion 31*a* is closed and the second reflecting surface 42 for reflecting the light beam from the light source 2 when the cut portion 31*a* is opened.

3 Claims, 5 Drawing Sheets

HEADLAMP WITH BEAM DISTRIBUTION SWITCH MECHANISM

BACKGROUND OF THE INVENTION

1. Field of the Invention

The present invention relates to a headlamp for a car or other vehicles. More specifically, the present invention relates to a headlamp using a metal halide discharge lamp such as an iodine lamp for a light source, in which is difficult to include two light sources for the high beam and the low beam.

2. Background Art

An example of a headlamp in the prior art that uses a discharge lamp as a light source and has a switch mechanism for selecting the high beam distribution or the low beam distribution is disclosed in Japanese Unexamined Patent Publication No. Hei 8-111101. As shown in FIG. 10, the principal part of the headlamp 90 includes a discharge lamp 91, a reflecting mirror 93 and a lever 92 that is placed vertically with a rocking pin 92*a* disposed above the discharge lamp 91. The discharge lamp 91 is attached to the lever 92, and the light source 91*a* that is a burner of the discharge lamp 91 is positioned substantially on the optical axis Z when the discharge lamp 91 is in the low beam position. When switching to the high beam position, the lever 92 is rotated in the backward direction for a predetermined angle α around the rocking pin 92*a* by the actuator 94 such as a motor or a solenoid. Then, the position of the discharge lamp 91 is moved backward and downward from the low beam position with respect to the reflecting mirror 93, so that the discharge lamp 91 moves into the high beam position.

However, in the above-mentioned switching mechanism for selecting the high beam distribution or the low beam distribution in the prior art, it is essential to maintain very high accuracy of the relative position of the light source 91*a* to the reflecting mirror 93 in order to obtain a predetermined characteristic of the light distribution. Therefore, the light source 91*a* should be moved between the low beam position and the high beam position with high accuracy. However, the accuracy can be deteriorated by vibration, an impact, an abrasion due to a repeated movement of the light source or other factors when the car is moving. In order to solve this problem, the known mechanism is complicated and large, resulting in a high cost.

SUMMARY OF THE INVENTION

An object of the present invention is to provide a headlamp that does not need to move a moving member with high accuracy when switching the low beam distribution to the high beam distribution or vice versa by moving the member.

Another object of the present invention is to provide a headlamp that has a simple mechanism for switching the low beam distribution and the high beam distribution with an ensured accuracy and without being subject to a variation due to vibration, an impact, an abrasion due to a repeated movement or other factors when the car is moving.

Another object of the present invention is to provide a headlamp that satisfies the above mentioned characteristics and can be compact in size.

According to an aspect of the present invention, in a headlamp having a beam distribution switch mechanism for selecting the low beam distribution or the high beam distribution, the beam distribution switch mechanism comprises a hood including a fixed member having a cut portion on the upper or the lower side and a moving member for opening and closing the cut portion of the fixed member, a reflecting mirror including a first reflecting surface for reflecting the light beam from the light source when the cut portion of the hood is closed so as to generate the low beam, and a second reflecting surface for reflecting the light beam passing through the cut portion from the light source when the cut portion is opened so as to generate an auxiliary beam distribution that is added to the low beam distribution to generate the high beam distribution.

According to another aspect of the present invention, the fixed member of the above-mentioned headlamp is formed in a box shape having an opening on the rear side, the moving member is a platy member disposed in parallel to and pivoted to the side that has the cut portion by a pivot shaft, and the cut portion is opened or closed by rotating the moving member.

Furthermore, according to another aspect of the present invention, the fixed member of the above-mentioned headlamp is formed in a box shape having an opening on the rear side, the moving member is a saddle-like member disposed inside the fixed member and is pivoted to each side face of the fixed member that is perpendicular to the side that has the cut portion by a pair of pivot shafts, and the cut portion is opened or closed by swinging the moving member.

BRIEF DESCRIPTION OF THE DRAWINGS

These and other objects and advantages of the present invention will become clear from the description with reference to the accompanying drawings, wherein.

DETAILED DESCRIPTION OF THE PREFERRED EMBODIMENTS

The present invention is described in detail hereinafter with reference to embodiments shown in the accompanying drawings.

Figure 1:
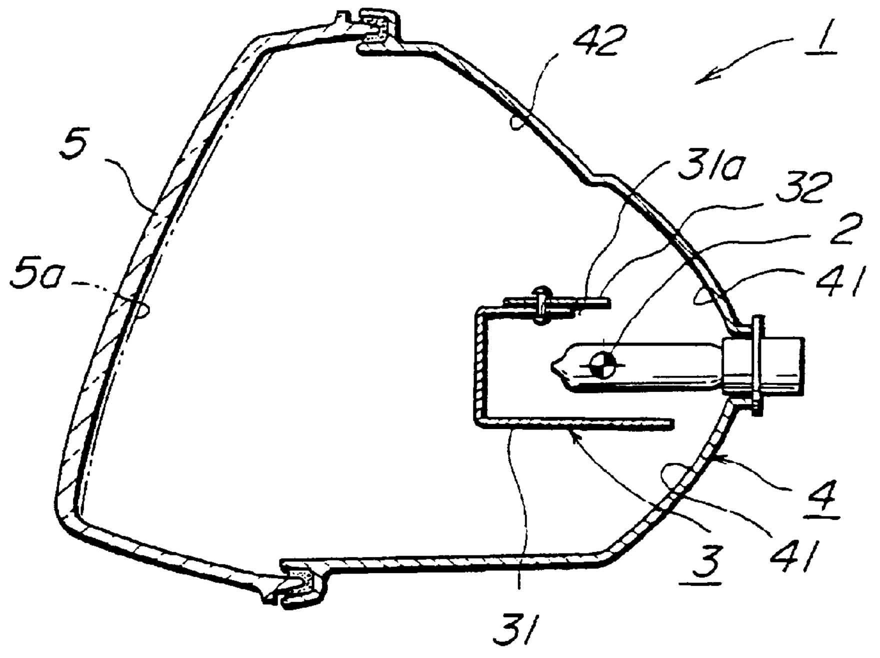
FIG. 1 is a cross section of the headlamp in accordance with a first embodiment of the present invention.

As shown in FIG. 1, headlamp 1 according to the present invention comprises a light source 2, a hood 3, a reflecting mirror 4 and a lens 5. This headlamp 1 of the present invention also comprises a beam distribution switch mechanism for selecting the low beam distribution or the high beam distribution which is composed of the hood 3 and the reflecting mirror 4.

Figure 2:
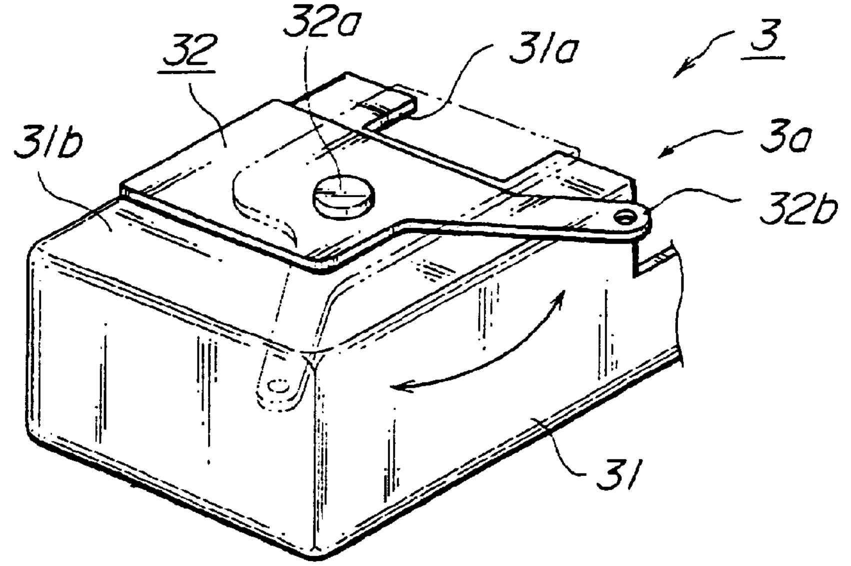
FIG. 2 is a perspective view of a hood that is the principal part of the headlamp shown in FIG. 1.

FIG. 2 shows a structure of the hood 3 that is a part of the beam distribution switch mechanism. The hood 3 is formed substantially in a box shape that has an opening 3*a* at one side. The hood 3 comprises a fixed member 31 having a cut portion 31*a* on one side adjacent to the opening 3*a*, and a platy moving member 32 that is disposed parallel to the side 31*b* with the cut portion 31*a* of the fixed member 31 and is pivoted to a side 31*b* by a pivot shaft 32*a*. The moving member 32 has a lever member 32*b*, which is actuated by appropriate means such as a solenoid or a motor (not shown), so that the cut portion 31*a* can be closed or opened selectively.

As shown in FIG. 1, the hood 3 covers the light source 2 so that the light beam can reach the reflecting mirror 4 within a proper range, as explained in detail later. In addition, the hood 3 is provided with a proper stay (not shown) for connecting the hood 3 to the reflecting mirror 4 to make a unit, and the relative position between the hood 3 and the reflecting mirror 4 is hardly altered. Furthermore, the light source 2 is also fixed to the reflecting mirror 4 by a socket for example, and the relative position between the light source 2 and the reflecting mirror 4 is hardly altered.

Figure 3:
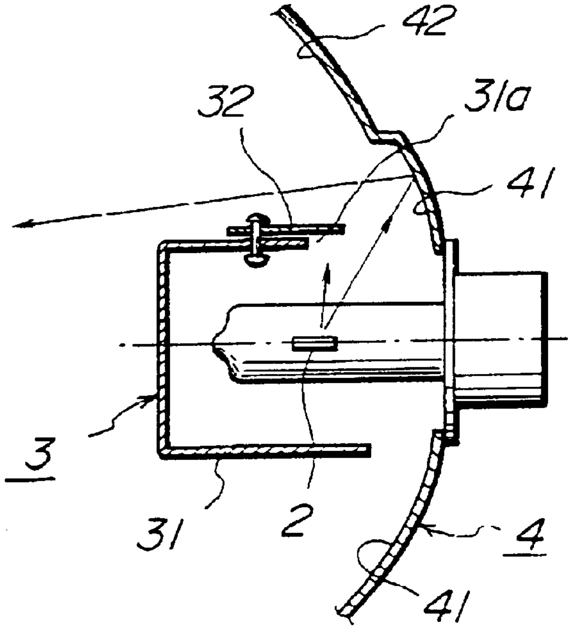
FIG. 3 is a schematic illustration showing the headlamp shown in FIG. 1 generating the low beam distribution.
Figure 4:
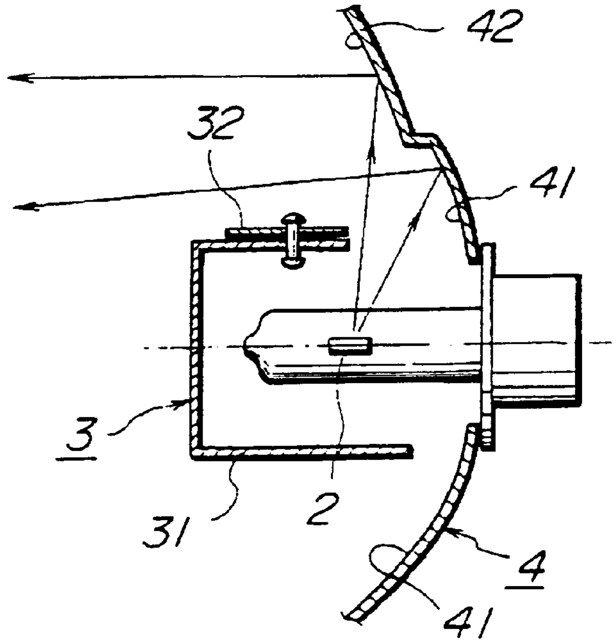
FIG. 4 is a schematic illustration showing the headlamp shown in FIG. 1 generating the high beam distribution.
Figure 5:
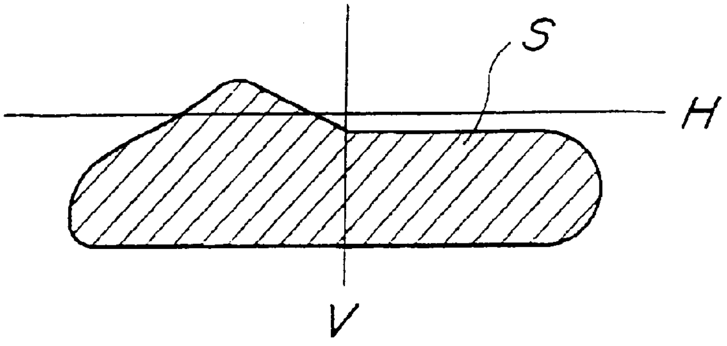
FIG. 5 illustrates the low beam distribution generated by the headlamp shown in FIG. 1.

FIGS. 3 and 4 show the reflecting mirror 4 that is a part of the beam distribution switch mechanism, the light source 2 and the hood 3, and particularly illustrates the relationship between the action of the hood 3 and the light source 2. First, in the state that the cut portion 31*a* of the hood 3 is closed by the moving member 32 as shown in FIG. 3, in an area that the light beam from the light source 2 reaches a first reflecting surface 41 is formed on the reflecting mirror 4. The first reflecting surface 41 is formed in the shape such as to generate the low beam distribution S as shown in FIG. 5.

One example of the method for generating the low beam distribution is as follows. The first reflecting surface 41 is formed in a paraboloid shape, and the light source 2 is disposed properly in front of the focal point of the paraboloid. In addition, a part of the light beam from the light source 2 that can reach the lower potion of the first reflecting surface 41 is cut by the hood 3. Then, the reflected light beam that is generated by the first reflecting surface 41 does not contain the upward light beam. Then, the reflected light beam is diffused horizontally by the lens cut 5*a* (see FIG. 1) provided to the lens 5, so that the substantial low beam distribution can be obtained.

FIG. 4 shows the state wherein the moving member 34 is moved so as to open the cut portion 31*a* of the hood 3. In this state, the light beam from the light source 2 passes through the cut portion 31*a* to be added to the light beam that reaches the first reflecting surface 41. Furthermore in the present invention, a second reflecting surface 42 is formed on the reflecting mirror 4 in the area that the light beam passing through the cut portion 31*a* reaches.

Figure 6:
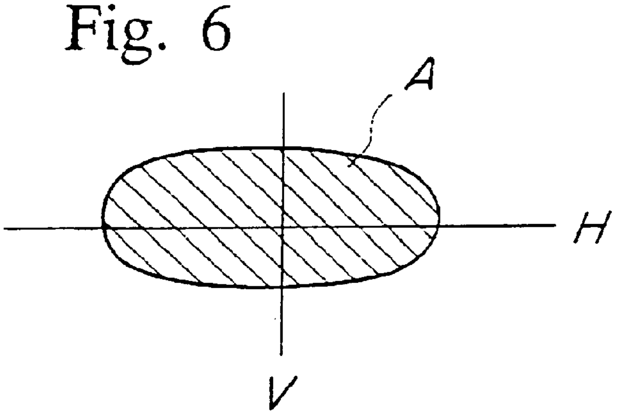
FIG. 6 illustrates an auxiliary beam distribution generated by the headlamp shown in FIG. 1.
Figure 7:
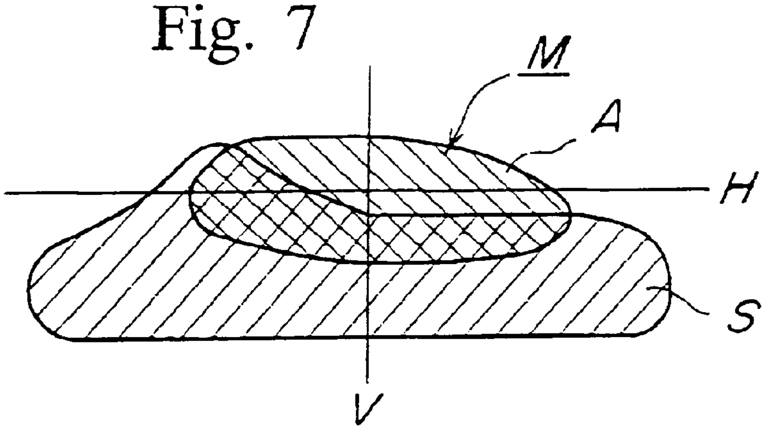
FIG. 7 illustrates the high beam distribution generated by the headlamp shown in FIG. 1.

In this structure, the second reflecting surface 42 generates a reflected light beam shown as an auxiliary beam distribution A in FIG. 6, which contains a slightly upward beam and is emitted horizontally to reach to a distance in front of the vehicle. This auxiliary beam distribution A is added to the low beam distribution S generated by the first reflecting surface 41 so as to generate the composed beam that can be used as a high beam distribution M as shown in FIG. 7.

Next, actions and effects of the headlamp 1 having the above-mentioned structure according to the present invention will be explained. In the structure of the present invention, only the moving member 32 provided to the hood 3 moves when switching from the low beam distribution M to the high beam distribution S or switching vice versa. The moving member 32 moves only for opening or closing the cut portion 31*a*. Therefore, not so high accuracy is required, but stoppers or the like provided to both ends of the rotation range, for example, will provide a sufficient accuracy.

Furthermore, in the present invention, the relative positions among the light source 2, the hood 3 and the reflecting mirror 4, for example, which requires high accuracy for generating a proper light beam distribution, are securely fixed. Therefore, there is little possibility to cause variation by a vibration, an impact, an abrasion due to a repeated movement or other factors when the car is moving, and the switching accuracy can be ensured with the above-mentioned simple structure.

Figure 8:
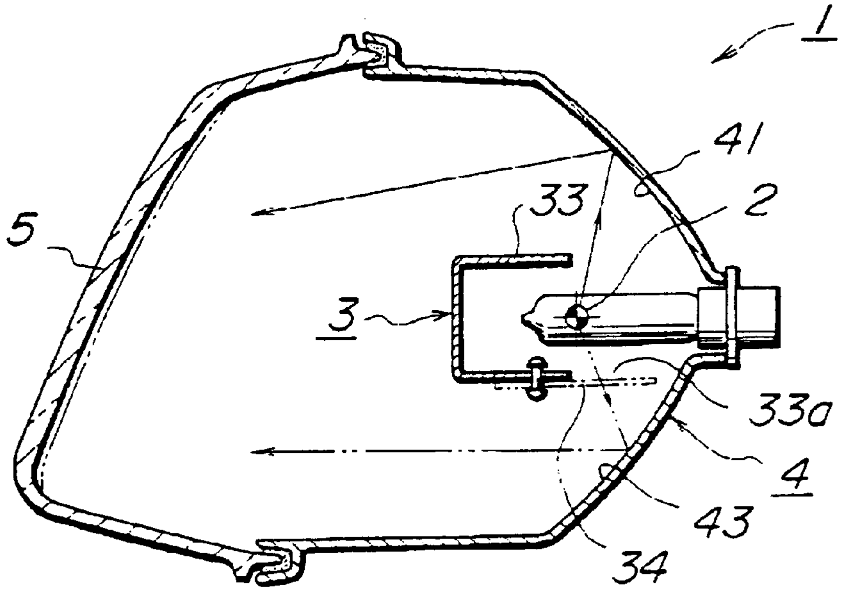
FIG. 8 is a cross section of the headlamp in accordance with a second embodiment of the present invention.

FIG. 8 shows a second embodiment of the present invention. On the contrary to the first embodiment in which the upper side of the fixed member 31 of the hood 3 is provided with the cut portion 31*a* and the moving member 34, this embodiment has a cut portion 33*a* and a moving member 34 on the lower side of the fixed member 33 of the hood 3. The upper side of the fixed member 33 in this embodiment is made in the shape such that the cut potion 31*a* in the first embodiment is closed.

The reflecting mirror 4 is provided with a first reflecting surface 41 for generating the low beam in the area that the light beam from the light source 2 reaches when the cut portion 33*a* is closed. Since the upper side of the fixed member 33 is made in the shape such that the cut potion 31*a* in the first embodiment is closed, the first reflecting surface 41 should be made basically in the same area and shape as in the first embodiment.

Furthermore, the reflecting mirror 4 is also provided with a second reflecting surface 43 in the area that the light beam from the light source 2 reaches when the cut portion 33*a* is opened. The second reflecting surface 43 is formed in a paraboloid shape whose focal point is the light source 2, for example. Then, the reflected light beam from the second reflecting surface 43 contains a slightly upward beam and is emitted horizontally to reach to a distance in front of the vehicle. Therefore, the high beam distribution can be obtained by adding this reflected light beam to the low beam distribution.

In this embodiment, the first reflecting surface 41 and the second reflecting surface 43 are formed in the upper area and the lower area with respect to the light source, while the first embodiment have to employ the second reflecting surface 42 formed in the above area of the first reflecting surface 41. Thus, the present embodiment can facilitate a compact size of the headlamp 1.

Figure 9:
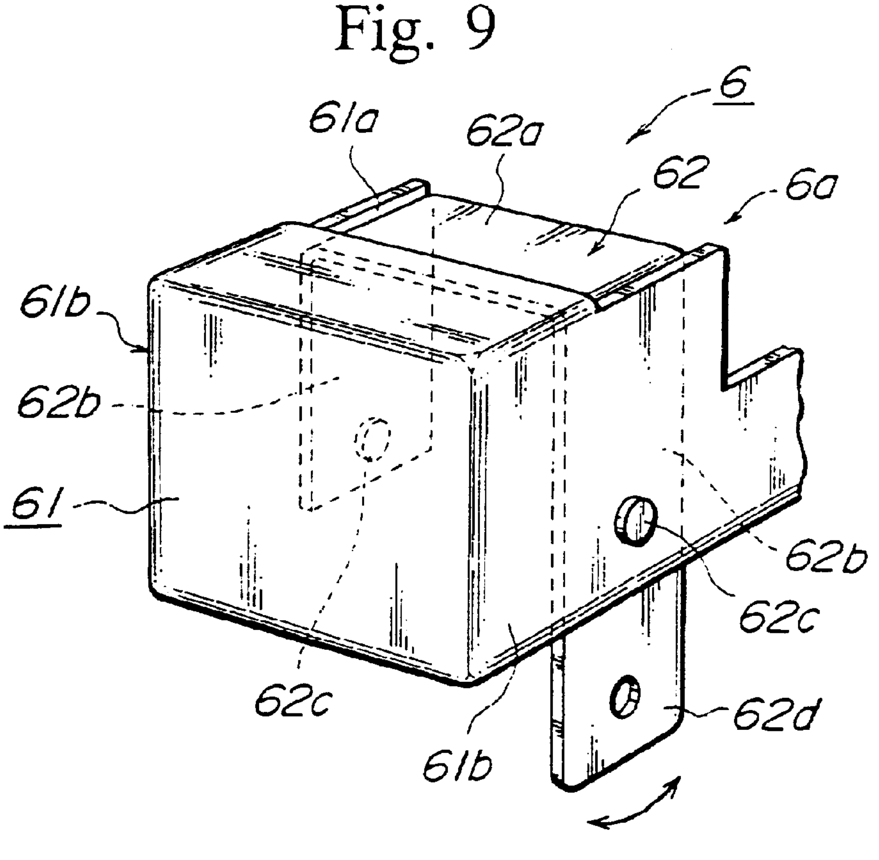
FIG. 9 is a perspective view of the principal part of the headlamp in accordance with a third embodiment of the present invention.
Figure 10:
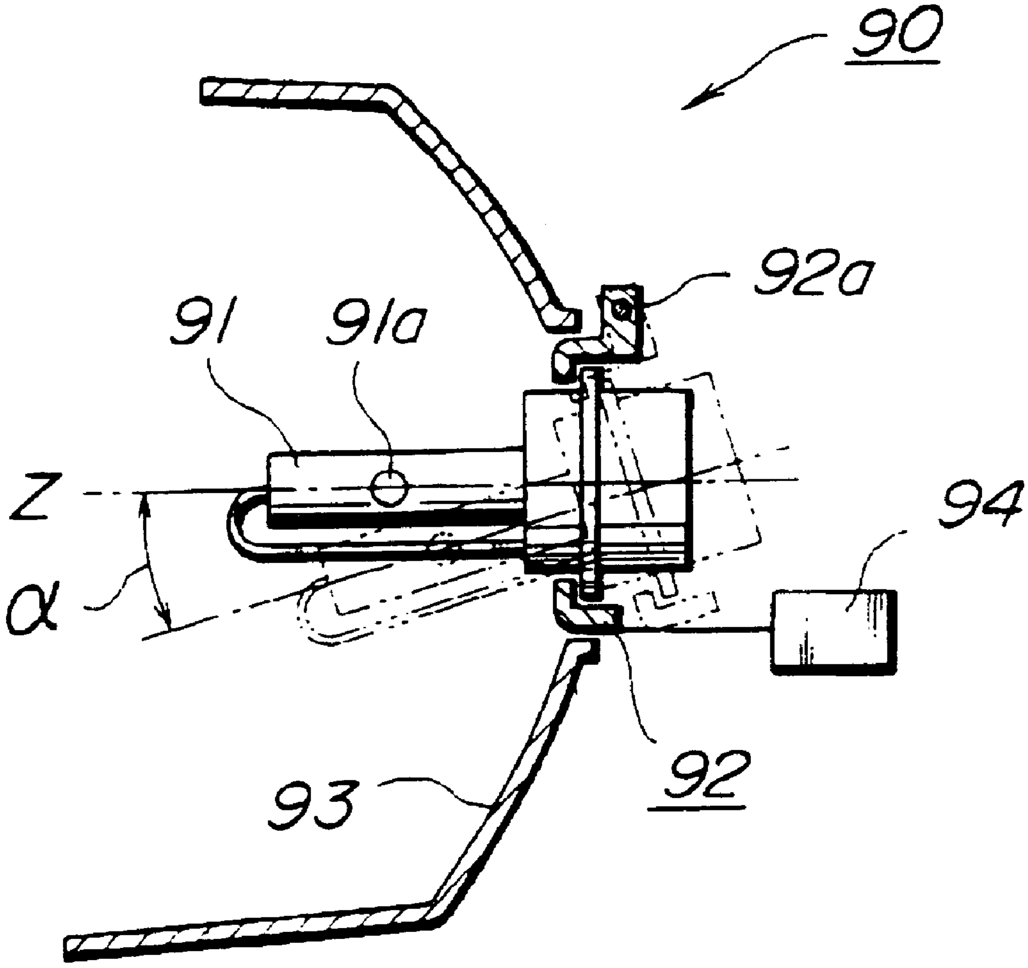
Fig. 10 Prior Art
FIG. 10 is a cross section of the headlamp in the prior art.

FIG. 9 shows a principal part of the headlamp 1 according to the third embodiment of the present invention. In this embodiment too, the hood 6 is formed substantially in a box shape having the opening 6*a* in the rear side. This hood 6 comprises a fixed member 61 having a cut portion 61*a* adjacent to the opening 6*a*, and a moving member 62 for opening or closing the cut portion 61*a* of the fixed member 61.

In this embodiment, the moving member 62 has a substantially rectangular shape. More specifically, the moving member 62 is formed in a saddle-like shape having a back portion 62*a* for closing the cut portion 61*a* and a pair of leg portions 62*b* hanging from each end of the back portion 62*a* perpendicularly. The moving member 62 is pivoted to each side face 61*b* of the fixed member 61 at each leg portion 62*b* by a pair of pivot shafts 62*c*. The side face 61*b* of the fixed member 61 is perpendicular to the upper side provided with the cut portion 61*a*.

The moving member 62 is disposed inside the fixed member 61 and attached to the inside of the fixed member 61. One of the leg portions 62*b* is extended to make a lever portion 62*d*, which is manipulated so that the back portion 62*a* of the moving member 62 swings backward and forward. Thus, the cut portion 61*a* is opened or closed, so that the same effect can be obtained as the preceding embodiments.

As mentioned above, according to the present invention, the low beam distribution and the high beam distribution can easily switched by the simple action, i.e., opening or closing the cut portion without changing the relative positions among the light source, the reflecting mirror and the hood that require a high accuracy. Thus, excellent effects can be obtained for cost reduction and improvement of reliability, that is little possibility of causing variation by a vibration, an impact, an abrasion due to a repeated movement or other factors when the car is moving.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A headlamp having a light source and a beam distribution switch mechanism for selecting a low beam distribution or a high beam distribution, wherein the beam distribution switch mechanism comprises a hood including a fixed member having a cut portion on the upper or the lower side of the fixed member and a moving member movable for opening and closing the cut portion of the fixed member, a reflecting mirror including a first reflecting surface positioned for reflecting light beams from the light source when the cut portion of the hood is closed by the moving member so as to generate the low beam distribution, and a second reflecting surface for reflecting the light beams passing through the cut portion from the light source when the cut portion is opened by moving the moving member so as to generate an auxiliary beam distribution that is added to the low beam distribution to generate the high beam distribution, the fixed member is formed in a box shape having an opening on the rear side, the moving member is a platy member disposed in parallel to and pivoted to the side of the fixed member that has the cut portion by a pivot shaft, and the cut portion is opened or closed by rotating the moving member on the pivot shaft.

2. A headlamp having a light source and a beam distribution switch mechanism for selecting a low beam distribution or a high beam distribution, wherein the beam distribution switch mechanism comprises a hood including a fixed member having a cut portion on the upper or the lower side of the fixed member and a moving member movable for opening and closing the cut portion of the fixed member, a reflecting mirror including a first reflecting surface positioned for reflecting light beams from the light source when the cut portion of the hood is closed by the moving member so as to generate the low beam distribution, and a second reflecting surface for reflecting the light beams passing through the cut portion from the light source when the cut portion is opened by moving the moving member so as to generate an auxiliary beam distribution that is added to the low beam distribution to generate the high beam distribution, the fixed member is formed in a box shape having an opening on the rear side, the moving member is a saddle-like member disposed inside the fixed member, the saddle-like member being pivoted to each side face of the fixed member that is perpendicular to the side that has the cut portion by a pair of pivot shafts, and the cut portion is opened or closed by swinging of the moving member.

3. A headlamp having a beam distribution switch mechanism for selecting a low beam distribution or a high bean distribution, wherein the beam distribution switch mechanism comprises a hood including a fixed member having a cut portion on the upper or the lower side thereof and a moving member for opening and closing the cut portion of the fixed member, a reflecting mirror including a first reflecting surface for reflecting the light beam from the light source when the cut portion of the hood is closed so as to generate the low beam distribution, a second reflecting surface for reflecting the light beam passing though the cut portion from the light source when the cut portion is opened so as to generate an auxiliary beam distribution that is added to the low beam distribution to generate the high beam distribution.

* * * * *